(12) United States Patent
Verma (10) Patent No.: US 11,971,913 B2
(45) Date of Patent: Apr. 30, 2024

(54) AUTO-GENERATION OF SUPPORT TREES

(71) Applicant: SAP SE, Walldorf (DE)

(72) Inventor: Sudhir Verma, Gurgaon (IN)

(73) Assignee: SAP SE, Walldorf (DE)

( * ) Notice: Subject to any disclaimer, the term of this patent is extended or adjusted under 35 U.S.C. 154(b) by 116 days.

(21) Appl. No.: 17/576,405

(22) Filed: Jan. 14, 2022

(65) Prior Publication Data

US 2023/0229680 A1    Jul. 20, 2023

(51) Int. Cl.
| | | |
|---|---|---|
| G06F 16/00 | (2019.01) | |
| G06F 16/31 | (2019.01) | |
| G06F 16/332 | (2019.01) | |
| G06F 16/34 | (2019.01) | |
| G06F 16/35 | (2019.01) | |

(52) U.S. Cl.
CPC ........ *G06F 16/322* (2019.01); *G06F 16/3329* (2019.01); *G06F 16/345* (2019.01); *G06F 16/35* (2019.01)

(58) Field of Classification Search
CPC .... G06F 16/322; G06F 16/35; G06F 16/3329; G06F 16/345
USPC ........................................................ 707/797
See application file for complete search history.

(56) References Cited

U.S. PATENT DOCUMENTS

| | | | |
|---|---|---|---|
| 9,436,758 B1* | 9/2016 | Lewis ................ | G06F 16/3329 |
| 2002/0022986 A1* | 2/2002 | Coker .................... | G06Q 30/02 |
| | | | 717/115 |
| 2009/0083246 A1* | 3/2009 | Coker .................... | G06Q 30/02 |
| | | | 707/E17.061 |
| 2012/0005218 A1* | 1/2012 | Rajagopal ........... | G06F 16/3329 |
| | | | 707/E17.084 |
| 2013/0159896 A1* | 6/2013 | Mayerle ........... | G06Q 10/06375 |
| | | | 715/765 |
| 2017/0177715 A1* | 6/2017 | Chang ...................... | G06N 5/04 |
| 2019/0220695 A1* | 7/2019 | Nefedov ................ | G06N 20/00 |
| 2019/0228315 A1* | 7/2019 | Xu .......................... | G06F 9/453 |
| 2023/0023869 A1* | 1/2023 | Ganesan ............. | G06F 16/3329 |

* cited by examiner

*Primary Examiner* — Monica M Pyo
(74) *Attorney, Agent, or Firm* — SCHWEGMAN LUNDBERG & WOESSNER, P.A.

(57) ABSTRACT

Programs, systems, and methods for generating a support tree for automated resolution of user issues. In some embodiments, historical data may be obtained from a history of support interactions including historical issues and solutions to the historical issues. Most used solutions may be determined and stored with associated historical issues. Clusters of issues and solutions may be generated and labeled for generation of support tree nodes. Furthermore, solutions may be correlate such that a plurality of solutions may be provided for the resolving user issues. In some embodiments, issue data indicative of user issues may be provided by users. As the user provides issue data, deflections between nodes on the support tree may narrow a field of potential solutions to one or more solutions to be provided to the user.

20 Claims, 6 Drawing Sheets

202 — Title: GI status incorrect.
204 — Symptom: Warehouse Activity is completed for the outbound delivery order, but the related stocks are still in GI, the outbound delivery in ECC is still open.
206 — Reproducing the Issue:

1. Display the outbound delivery order via tcode /n/SCWM/PRDO in EWM, in Status tab, DCO=9.
2. Navigate to Outbound Delivery via Display Additional Data tab, the outbound delivery exists.
3. Check the stock information via warehouse monitor, the related stocks are still in GI-bin.
4. If the stock is "Packed" in the delivery HU tab you can see the HU has the status "B".
5. Check the Goods Issue warehouse tasks via warehouse monitor and DB table /SCWM/ORDIM_C, the GI WTs don't exist.
6. Check table /SCWM/DLV_RECOVE, it has no entry.

208 — Cause: Dummy GI document flow links

210 — Resolution:

1. Run transaction /SCWM/CHM_LOG and go to Ad-Hoc.
2. Navigate to Outbound Delivery Process -> Document Flow -> Superfluous Document Flow Links.
3. In the "outbound Delivery Process" enter the Warehouse and Delivery number.
4. In the "Superfluous Document Flow Links" filter for "GI" document flow links.
5. Execute the selection.
6. Double-click the "Superfluous Document Flow Links" menu on the left side.
7. If the tool found the dummy GI document links you can check the details. It will display the document flow link which should be removed.
8. Right click on the "message Text" and select the option "Correct Interactively..."

| Solution Number | Textual Data Tokens(TF-IDF) | | | | Keywords Token | Releases | | | Link to Other Solutions | | |
|---|---|---|---|---|---|---|---|---|---|---|---|
| | Dummy | status | outbound | ... | FAKE_GI | P1 | P2 | P3 | 2604688 | 2700178 | ... |
| | 0.4 | 0.2 | 0.5 | | 1 | 1 | 1 | 0 | 1 | 1 | 0 |

AUTO-GENERATION OF SUPPORT TREES

BACKGROUND

1. Field

Embodiments of the present teachings relate to systems and processes for automatically generating support trees. Specifically, embodiments of the present teachings relate to electronic automatic generation of support trees to resolve user issues.

2. Related Art

Typically, when users of computer applications experience technical issues, the user contacts customer support. The user may then fill out a ticket to obtain assistance in resolving the technical issues. The resolution may be provided by a live support assistant or an automatic computer-generated support assistant. Typically, both cases require experts determining questions to provide the users and determining solutions to the technical issues. The experts then utilize the technical issues and the expert's experience to create questions and solutions that are organized into a support tree. The users may interact with the support tree to iteratively resolve the issues. The questions may be provided to the users and responses may be received. Based on the responses, a next question or a solution is provided that is also determined by the experts. Determination of the questions and solutions requires a tremendous amount of time of many experts.

Because of the quickly changing environment of systems as a service (SaaS), new technical issues arise quickly. As such, more and more expert time is being spent resolving the issues and manually updating questions and solutions for creating support trees for automatically resolving the issues. Therefore, as more updates and more SaaS issues arise, the experts are not able to keep up with the high demand for expert time. Furthermore, as the automated systems fall behind, more help tickets are created when the issues are not resolved. As such, the experts spend more time resolving issues than updated the support tree, and the automatic systems fall further behind. This creates a cycle where the experts cannot keep up with updating the automatic systems.

Furthermore, the current automatic systems are decided by experts based on the expert's own experiences. The experts' experiences do not comprise all past issues and all past solutions. Therefore, all past issues and all past solutions are not evaluated in determining deflections to new questions and solutions. As such, a support tree built by experts does not provide a complete and efficient deflection response. The support tree is not optimized for deflection and, as a result, the most efficient questions and solutions are not provided to the user. This results in a higher ticket rate and more required expert time than would be provided by a fully optimized support tree.

What is needed are systems, programs, and methods that automatically generate support trees that optimize support tree deflection by utilizing historical data from support issues and solutions. Furthermore, the systems, programs, and methods, should increase efficient deflection, decrease ticket generation, and decrease expert time spent generating and evaluating support trees and tickets. Further still, the interaction linking the user with the back-end optimized functionality by the user interface provides optimized and efficient solutions to the technical issues faced by the user.

SUMMARY

Embodiments of the disclosure solve the above-described problems by providing programs, systems, and methods for optimizing support tree deflection based on historical data. A first embodiment is directed to a method of generating a support tree for automated resolution of user issues. The method comprises obtaining historical data comprising a history of support interactions including historical issues and solutions to the historical issues, determining a number of most used solutions from the solutions to the historical issues, generating correlations between the most used solutions, generating clusters of the most used solutions and associated historical issues, determining keywords from the historical issues and associated most used solutions, generating labels for each cluster based on determined keywords, generating a plurality of questions to obtain issue information from a user, and generating the support tree comprising a plurality of nodes associated with the clusters and the labels, wherein each node of the plurality of nodes is indicative of one or more associated historical issues and one or more solutions to the one or more associated historical issues.

A second embodiment is directed to one or more non-transitory computer-readable media storing computer-executable instructions that, when executed by a processor, perform a method of generating a support tree for automated resolution of user issues. The method comprises obtaining historical data comprising a history of support interactions including historical issues and solutions to the historical issues, determining a number of most used solutions from the solutions to the historical issues, generating correlations between the most used solutions, generating clusters of the most used solutions and associated historical issues, determining keywords from the historical issues and associated most used solutions, generating labels for each cluster based on determined keywords, generating a plurality of questions to obtain issue information from a user, and generating the support tree comprising a plurality of nodes associated with the clusters and the labels, wherein each node of the plurality of nodes is indicative of one or more associated historical issues and one or more solutions to the one or more associated historical issues, wherein a first node of the plurality of nodes on the support tree comprises a plurality of related topics, and wherein deflecting from the first node to a second node reduces a field of potential issues and potential issue solutions to the potential issues.

A third embodiment is directed to a system for generating a support tree for automated resolution of user issues and resolving user issues. The system comprises a processor, one or more non-transitory computer-readable media storing computer-executable instructions that, when executed by a processor, perform a method of generating the support tree for the automated resolution of the user issues. The method comprises obtaining historical data comprising a history of support interactions including historical issues and solutions to the historical issues, determining a number of most used solutions from the solutions to the historical issues, generating correlations between the most used solutions, generating clusters of the most used solutions and associated historical issues, determining keywords from the historical issues and associated most used solutions, generating labels for each cluster based on determined keywords, generating a plurality of questions to obtain issue information from a user, and generating the support tree comprising a plurality of nodes associated with the clusters and the labels, wherein each node of the plurality of nodes is indicative of one or more associated historical issues and one or more solutions to the one or more associated historical issues, receiving issue data indicative of a user issue from a client device of the user, providing one or more questions of the plurality of questions to the user to obtain the issue information indicative of the user issue, deflecting between nodes on the support tree to reduce a field of possible solutions based on the issue information provided by the user in response to the one or more questions, and providing the one or more solutions to the user to resolve the user issue.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the disclosure will be apparent from the following detailed description of the embodiments and the accompanying drawing figures.

BRIEF DESCRIPTION OF THE DRAWING FIGURES

Embodiments of the disclosure are described in detail below with reference to the attached drawing figures, wherein:

FIG. 2A depicts an exemplary solution chart;

FIG. 2B depicts an exemplary solution vector;

The drawing figures do not limit the present teachings to the specific embodiments disclosed and described herein. The drawings are not necessarily to scale, emphasis instead being placed upon clearly illustrating the principles of the present teachings.

DETAILED DESCRIPTION

The following detailed description references the accompanying drawings that illustrate specific embodiments in which the present teachings can be practiced. The embodiments are intended to describe aspects of the present teachings in sufficient detail to enable those skilled in the art to practice the present teachings. Other embodiments can be utilized, and changes can be made without departing from the scope of the present teachings. The following detailed description is, therefore, not to be taken in a limiting sense. The scope of the present teachings is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Generally, embodiments of the present disclosure relate to automatically generating a support tree for resolving technical issues of applications and systems provided to users. In some embodiments, a user may encounter an issue utilizing an application on the user's computing device. The application may be any application associated with software, systems, and the like and may be stored on the computing device of the user or provided as SaaS or infrastructure as a service (IaaS). As such, the user may report the issue to an application provider and be presented a user interface for connected to support assistant system 100 depicted in FIG. 1 providing automated solutions to the issue.

In some embodiments, historical data comprising past issues and solutions may be obtained. Common issues and common solutions may be correlated and hierarchically categorized. In some embodiments, questions may be generated, and responses may be evaluated that provide the least number of deflections to obtain a valid solution to the issues thus increasing efficiency in resolving the issues and generating the least amount of help tickets sent to experts for manual resolution.

In some embodiments, there may be a plurality of solutions to issues. Solutions may generally be provided in natural language text for business applications such that any user may understand and provide follow the solution instructions. The solutions may comprise text, images, diagrams, and links to other resources. The solutions may provide instructions to implement other solutions. Furthermore, solutions may comprise computer-executable instruction for implementation by the user to resolve technical issues. The solutions may be provided in any combination such that the user may follow instructions, open other resources, and implement code to update the software and systems to resolve any issues.

Figure 1:
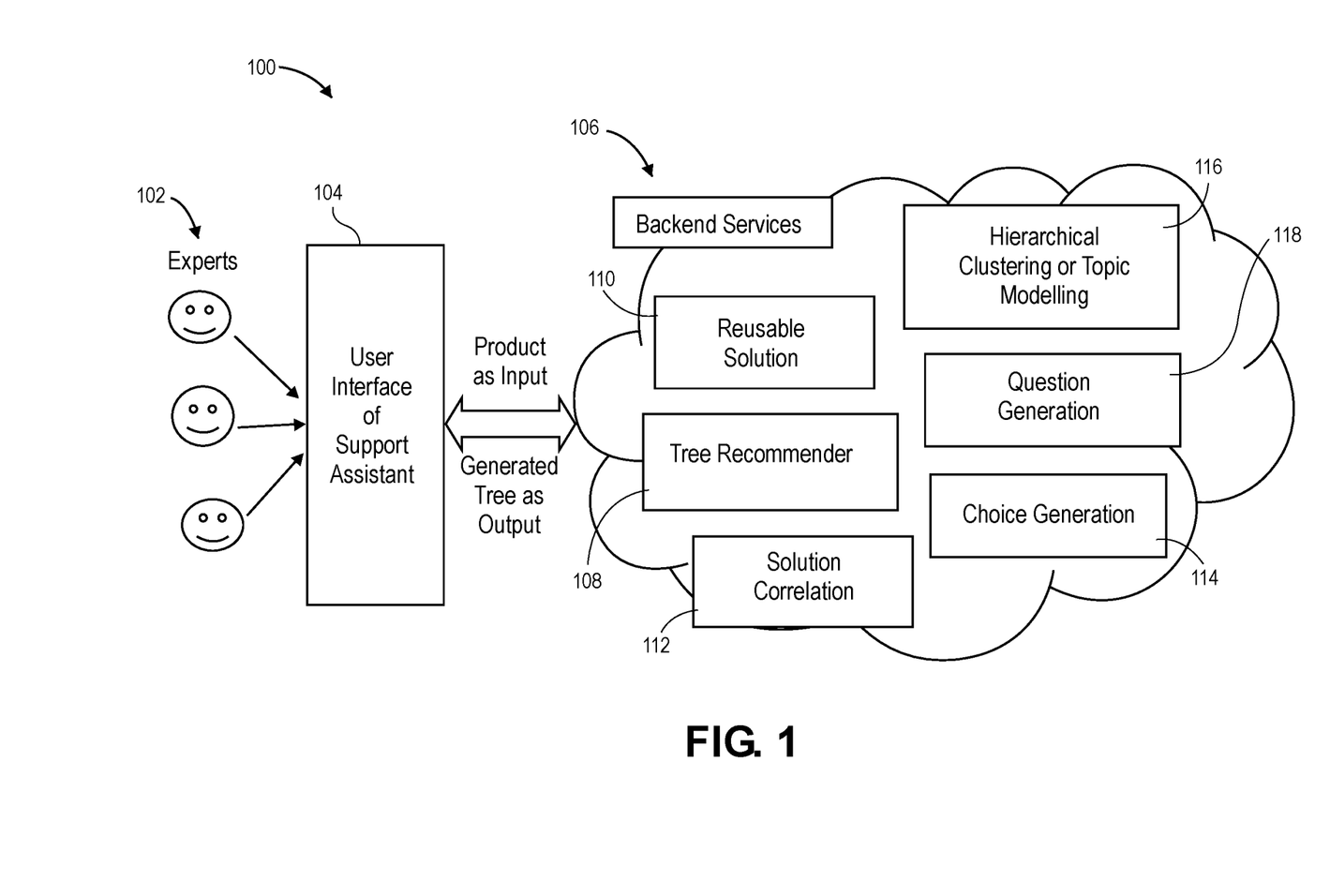
FIG. 1 depicts an exemplary flow diagram for providing solutions to issues by a support tree.

FIG. 1 depicts an exemplary support assistant system 100. In some embodiments, support assistant system 100 may provide auto-generation of support tree 300 (FIG. 3) for supporting a user that may have issues with software services and systems. The user may interface with a user interface (not shown) to answer questions related to the software issues. Support assistant system 100 may provide optimized solutions to the issues using support tree 300 automatically generated as described in embodiments herein.

Figure 3:
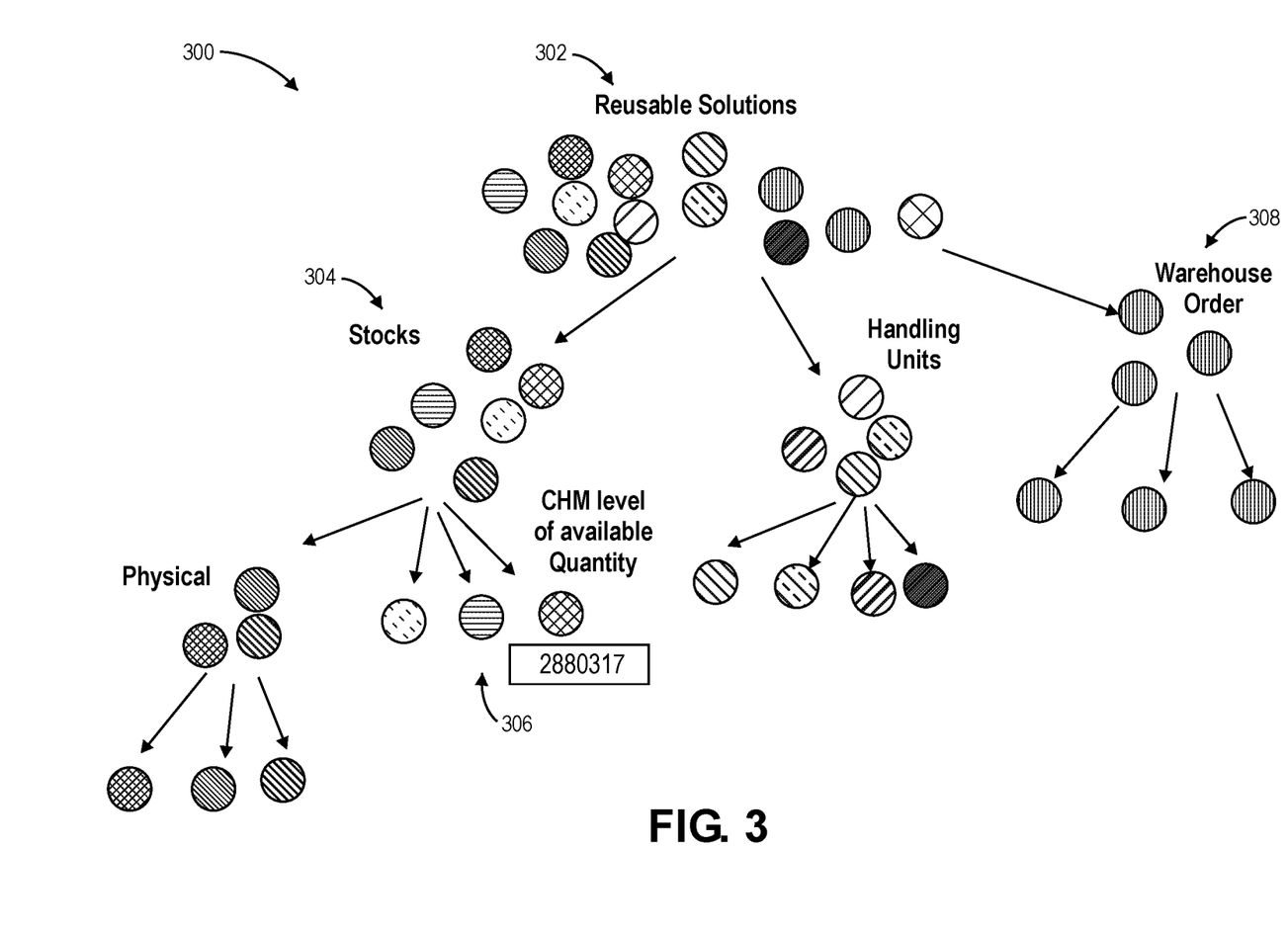
FIG. 3 depicts an exemplary support tree.

In some embodiments, support assistant system 100 comprises support assistance interface 104 for experts 102 to interface with backend services 106. Support assistance interface 104 may provide results and analytics associated with support assistant system 100 such that experts 102 may troubleshoot and resolve any user issues that remain unresolved and update support assistant system 100. Furthermore, experts 102 may update support assistant system 100 and run analytics and check results and maintain support assistant system 100. Support assistant system 100 may also be fully autonomous such that support tree 300 and any of the engines that generate support tree 300, described in embodiments herein, are updated automatically. Experts 102 may provide maintenance, support, and provide any updates to support assistant system 100 by support assistance interface 104.

In some embodiments, historical data may be obtained by support assistant system 100. The historical data may be any data associated with any service or application or a plurality of services and applications. As such, a history of user issues, user inputs, user responses to questions, expert inputs, and solutions to issues associated with all applications and services may be provided as the historical data. As such, support assistant system 100 may have access to a complete history of applications and services and interactions with those applications and services. The historical data may be used to train machine learning and statistical algorithms to provide optimized solutions to user issues as described in embodiments herein.

In some embodiments, backend services 106 comprises support tree generation engine 108, reusable solution engine 110, solution correlation engine 112, choice generation engine 114, modeling engine 116, and question generation engine 118. Support tree generation engine 108 may generate support tree 300 based on inputs from reusable solution engine 110, solution correlation engine 112, choice generation engine 114, modeling engine 116, and question generation engine 118. A user interface may display questions to users based on the user described issues. As the user provides information related to the issues in response to the questions, the process may deflect to various nodes on support tree 300 until a leaf node comprising a solution is achieved. The solution may be provided to the user to resolve the user issue. Generation of support tree 300 is described in more detail below.

In some embodiments, reusable solution engine 110 may provide a number (K) of reused solutions which were obtained from historical data. Reusable solution engine 110 may access historical data related to past user interactions and determine the issues that occur most over a recent or specified period. The historical data may comprise detailed accounts of user inputs, user issues, solutions, associated tickets, and resolutions. Reusable solution engine 110 may scan the historical data and find the most used solutions and order the top K most used recognized issues and solutions. Reusable solution engine 110 may scan through communications and solution structure of customer tickets and create an aggregate count of each solution in the historical dataset. The numbers extracted from the communications and customer tickets may be validated against the solution number. As such, the most common issues that users face may be tabulated for further analysis. Reusable solution engine 110 may be the basis for deflection between nodes on support tree 300. The reusable solutions may be an input to the machine learning algorithm for optimizing the most likely solutions to the user issues.

In an exemplary embodiment, an exemplary historical ticket may be scanned. The communication information from the user detailing the issue along with all possible solutions that were proposed may be evaluated. This task may be performed for all historical data for a designated time period such as, for example, one month, one year, two years, or any other time period based on a number of tickets or issues and periodic updating of software. Reusable solution engine 110 may then rank the top K solutions which were used the most to resolve the analyzed issues. Support tree 300 may be built providing a deflection maximization strategy based on the top K solutions provided by the reusable solution engine 110. In some embodiments, K may be any number of solutions such as 10, 50, 100, 200, or any other number. As such, the number of solutions may be based on the service or application that the user is using and the number of issues and solutions for that service or application in the historical data. Therefore, the number of solutions may be customizable and may be based on any input such as, for example, system updates, number of users, historic number of issues, time since last update, and the like.

In some embodiments, solution correlation engine 112 determines correlation between solutions to various user issues. For a given issue there may be a plurality of potential solutions. As such, the leaf nodes of support tree 300 may comprise a plurality of solutions. The historical data may be analyzed to correlate various user issues with common solutions. Correlating issues and solutions may reduce the search space and simplify the structure and generation of support tree 300. Highly correlated solutions may be recommended together resulting in a higher likelihood of resolving the issue and preventing reoccurrence of the issue. As such, solution correlation engine 112 may find solutions that should be combined, and solutions that should be offered as individual solutions. For example, the user may find inconsistencies in operational data. A solution may be issued directly for resolving the inconsistency issue; however, a secondary solution may be correlated with the issue and/or the solution. The secondary solution may resolve the underlying issue that created the operation data issue. As such, the user may only be aware of the surface-level issue that is resolved with a solution but not the underlying issue. Solution correlation engine 112 may correlate solutions for issues that the user may not be aware of, thus, resulting in generating support tree 300 with a more efficient system optimized for issue resolution.

In some embodiments, choice generation engine 114 provides labels for classified clusters of issues and solutions. In some embodiments, the user may be provided options such as, for example, stocks, handling units, or warehouse orders, as depicted in FIG. 3. The user may select stocks. As such, the algorithm moves to the stocks portion of the tree narrowing the search space to questions related to stocks that may then be asked of the user to further narrow the set of solutions. Solutions and issues related to stocks may then be analyzed upon further questioning from the user.

Furthermore, choice generation engine provides for naming, or classifying, of the clusters of issues and solutions. The historical data and correlations may be analyzed to provide names to the clusters. Any algorithm may be used from word frequency (e.g., word cloud), neural networks for semantic word meaning, word frequency and location analysis, and graph-based approaches to recognize words and the words semantic meaning to determine terms to associate with clusters of solutions and issues. Any algorithm may be used to extract words and word frequency for naming the various word clusters. Furthermore, any number of clusters may be used based on correlations between the issues and the solutions as described above. If the correlations are below a specified threshold, a separate cluster may be created based on a lower likelihood of same/similar solutions. Furthermore, the keywords and highest ranked words from the language recognition and word counts may be used to title each cluster or provide and rank keywords associated with each cluster.

In some embodiments, modeling engine 116 may utilize hierarchical clustering, topic modeling, or any other type of modeling technique to achieve the results as described herein. In some embodiments, the top used solutions and/or issues may be analyzed for textual data, terms, priority, correction details, and the like to present top used solutions and perform cluster/topic modeling. The issue and solution clusters may be modeled to be broken down into finer and finer granularity such that the search scope for solutions may be narrowed. The topics for clusters may be limited to a number that is not overwhelming for the user such that, in the end, the user may select between only a few choices from the questions at each node on support tree 300. The clusters may be limited to 2, 5, 10, or any number of topics; however, the topics may be limited to between 2 and 5 topics while remaining below a maximum number of questions. As the number of topics are reduced by each deflection from node to node on support tree 300, the number of questions may increase or decrease while still narrowing the field to find a solution. As such, there may be a tradeoff that increases the number of topics per cluster to greater than 5. In some embodiments, exemplary convolution neural networks for semantic speech recognition may be utilized and/or text mining and clustering may be performed using non-negative matrix factorization (NMF). Any statistical and machine learning algorithms may similarly be used to recognize text and cluster topics for automatic generation of support tree 300.

In some embodiments, question generation engine 118 may determine questions for a user or generate questions schemes to present to present to an expert to generate questions. A summarization technique may be used to generate questions. Question generation engine 118 may simply ask static questions such as, for example "choose one of the following options that best relates to your issue." Then titles for the clusters may be provided as described above such that the user may select a cluster. Similarly, at the next step, the user may be provided a similar question scheme with narrower clusters until a leaf node is achieved with proposed solutions. Alternatively, question generation engine may ask dynamic questions where a summarization technique may be applied to each cluster to generate questions. Any typical summarization technique may be used to generate specific questions based on the topics within each cluster and the historical data used to generate each cluster. In some embodiments, the summarization technique may be generated for experts and experts may create questions based on the summarizations. In some embodiments, the questions and question summarizations may be based on the information determined by the support assistant system 100 as shown in FIG. 2A and FIG. 2B.

FIG. 2A depicts an exemplary issue and solution chart 200. Issue and solution chart 200 may be generated based on analysis performed by the engines of backend services 106 described above. Issue and solution chart 200 depicted in FIG. 2A depicts an exemplary solution to a particular issue also reproduced in issue and solution chart 200. In some embodiments, the issue is received from the user in a description field provided by the user interface. The use may be labeled as issue symptom 204. The user description may be analyzed to extract keywords and semantic language recognition may provide an understanding of the issue described by the user. In some embodiments, issue symptom 204 may be a computer-generated reproduction of the user's description. In some embodiments, recognition of the text provided by the user may generate keywords and associated words with the determined issues may be used to generate title 202. Furthermore, the issue may be reproduced from the recognized text and the semantic meaning analysis at reproducing the issue 206. The issue may be reproduced into a sequence of events by the user and the service associated with the issue such that support assistant system 100 may analyze the issue for determining questions and solutions.

Issue cause 208 may be determined by associated causes correlated with the symptoms as described above. For example, the historical data may be analyzed based on user issues provided as issue symptom 204. Underlying issue cause 208 of the issue symptom 204 may be determined based on correlations between the issues such that any cause may have a high correlation with any associated symptom. The correlation may be determined based on a solution to the issue cause 208 that results in corresponding resolution of future symptoms, such as issue symptom 204. As such, a solution to the issue symptom 204 and a solution to the underlying issue cause 208 may also be closely correlated such that both the solution to the issue symptom 204 and the solution to the issue cause 208 may be provided to the user at resolution 210.

FIG. 2B depicts an exemplary vector 212 associated with the issue and solution chart 200 of FIG. 2A. In some embodiments, the data reproduced in FIG. 2A may be used in a single-string vector format to model topics and correlated solutions. Fields may be combined into the string and each attribute may be stored in numerical form associated with the attributes. For example, title, symptom, cause, and the like may be combined with keywords stored as a direct token and double or triple words combined into a single string by adding an underscore. After preprocessing, tokenization, and stop word removal vector 212 may be complete as shown. Once vector 212 is generated for each solution, vector 212 can then be passed to a modeling algorithm such as, for example, NMF described above. A number of top topics may be tried, and the quality of each topic may be measured with a non-overlapping number (K) attributes such as keywords, releases and textual tokens as shown in vector 212 of FIG. 2B.

FIG. 3 depicts an exemplary support tree 300 generated by support tree generation engine 108 as described in embodiments herein. In some embodiments, at the top of the tree exists reusable solutions 302 generated by reusable solution engine 110. The reusable solutions mark the beginning, or most general, of the most common solution topics. Here questions may be generated to filter the issue to narrower topics at the next level of the tree. For example, question may be generated to determine if the issue is related to stocks 304 or warehouse order 308. The user may then provide a response to the question that indicates that the issue is related to stocks 304. A similar process may then indicate that the issue is related to the help level of available quantity 306. As such, there may be three potential solutions having various probabilities of resolving the issue.

In some embodiments, the solutions may be provided to the user with the probabilities or the solution with the highest probability may be provided to the user. For example, if a first solution has a likelihood of 70% of resolving the issue and a second solution has a likelihood of 75% of resolving the issue, both solutions may be provided. Alternatively, the first solution may have a likelihood of 95% of resolving the issue while the second solution has a likelihood of 2% of resolving the issue. This high confidence may result in only providing the first solution to the user. Furthermore, the first solution and the second solution may be correlated, as described above. As such, both solutions may be provided to resolve symptom issues and causes issues.

Figure 4:
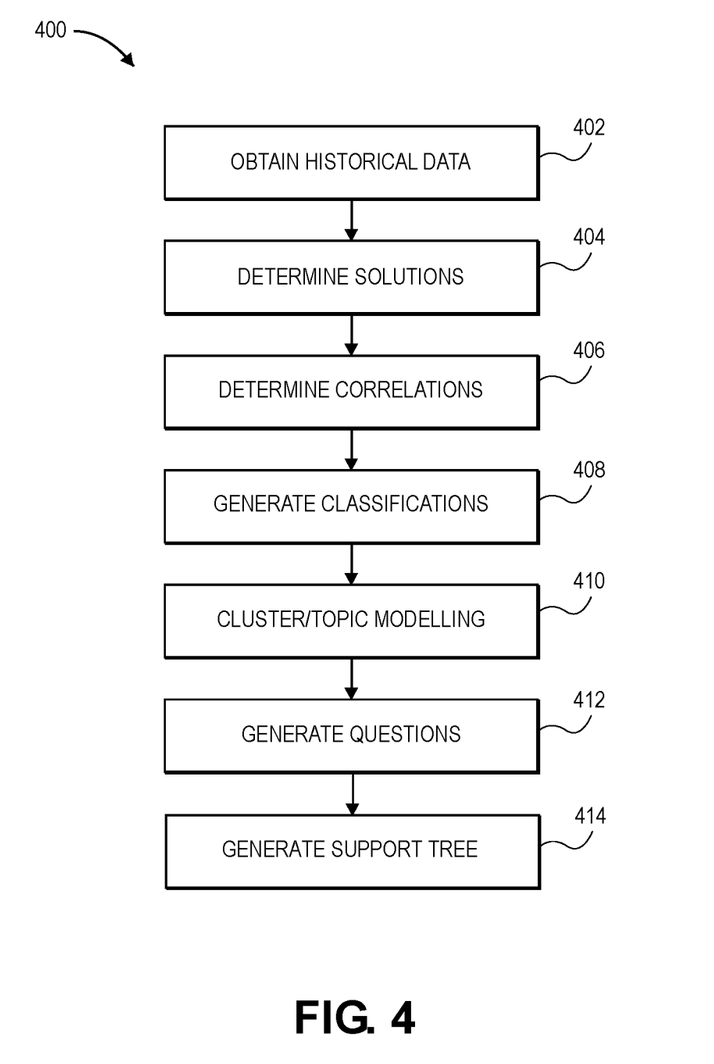
FIG. 4 depicts an exemplary process for generating the support tree of FIG. 3.

FIG. 4 depicts an exemplary method of generating support tree 300 for optimizing deflection for finding solutions to user issues generally referenced by numeral 400. At step 402, historical data may be obtained. In some embodiments, the historical data comprises any data that is collected and stored and associated with a particular software, application, or system. The historical data may comprise past issues and solutions that resolved the issues and solutions that were not effective in resolving the issues. As such, support assistant system 100 may learn the most effective solutions to the most common issues.

At step 404, reusable solution engine 110 analyzes the historical data to generate the most effective solutions to the most common issues as described in embodiments above. An amount K of top-rated issues and solutions based on frequency and effectiveness may be stored for use in generating support tree 300.

At step 406, solution correlation engine 112 may determine correlations between solutions such that a single solution may resolve a plurality of issues and, similarly, a plurality of solutions may be provided to resolve a single or a plurality of issues as described in embodiments above. A first, or primary, solution resolving an immediate surface-level issue, or symptom, may be provided. However, secondary solutions that resolve the underlying issue causing the surface-level issues may be correlated to the primary solution. The solutions may be correlated based on a recognition that when the secondary issue is implemented the symptom does not return; however, when the primary solution is implemented without the secondary solution, the symptoms return. As such, both the primary solutions and the secondary solutions may be provided to resolve the immediate surface-level issues but also resolve the underlying cause of the issues to prevent the surface-level issues from returning.

At step 408, choice generation engine 114 may provide labels for classifying clusters of issues and solutions. In some embodiments, labels such as for example, stocks, handling units, or warehouse orders, as depicted in FIG. 3, may be determined from the text of the issue or from responses to questions. The labels may provide categorical keywords and titles to the issues and solutions for recognizing the solutions that correspond to the issues. Furthermore, the labels may provide a simple mechanism for relaying issues and solutions to the user in an understandable way.

At step 410, modeling engine 116 may cluster issues and solutions in hierarchies based on topics. The hierarchies provide a mechanism for narrowing solution searches based on the determined issue keywords such that successive iterations, or deflections from each node on support tree 300, may return narrower fields of solutions. The user may answer questions narrowing moving to the subsequent hierarchy narrows the field of solutions until only a single or a few solutions remain to provide to the user. As such, the user is not overwhelmed with a large number of potential solutions.

At step 412, question generation engine 118 may be used to generated questions to provide to the user for narrowing the field of potential solutions. The questions may be tailored to obtain information from the user about the issue to deflect from a particular node, or hierarchy, to a successive node on support tree 300. As such, the field of solutions is narrowed when a more certain issue is determined.

At step 414, support tree generation engine 108 gathers the data determine from the back-end engines described above to generate support tree 300. As such, information may be obtained from the user to deflect from one node to another on support tree 300. As the information is obtained from the user, the issue is better understood causing a deflection to a subsequent node until a solution, or a plurality of solutions, that best resolve the issue is determined. Once support tree 300 is generated, experts may analyze the results and pose as users to determine the accuracy of the support tree 300 and the ease of use.

As users interact with support tree 300, the interactions may be stored and analyzed to improve support. The issues and solutions may continuously be updated to provide the most up-to-date support possible by support assistant system 100. In some embodiments, support assistant system 100 may be updated periodically and when updates to the applications, software, and systems is performed.

Figure 5:
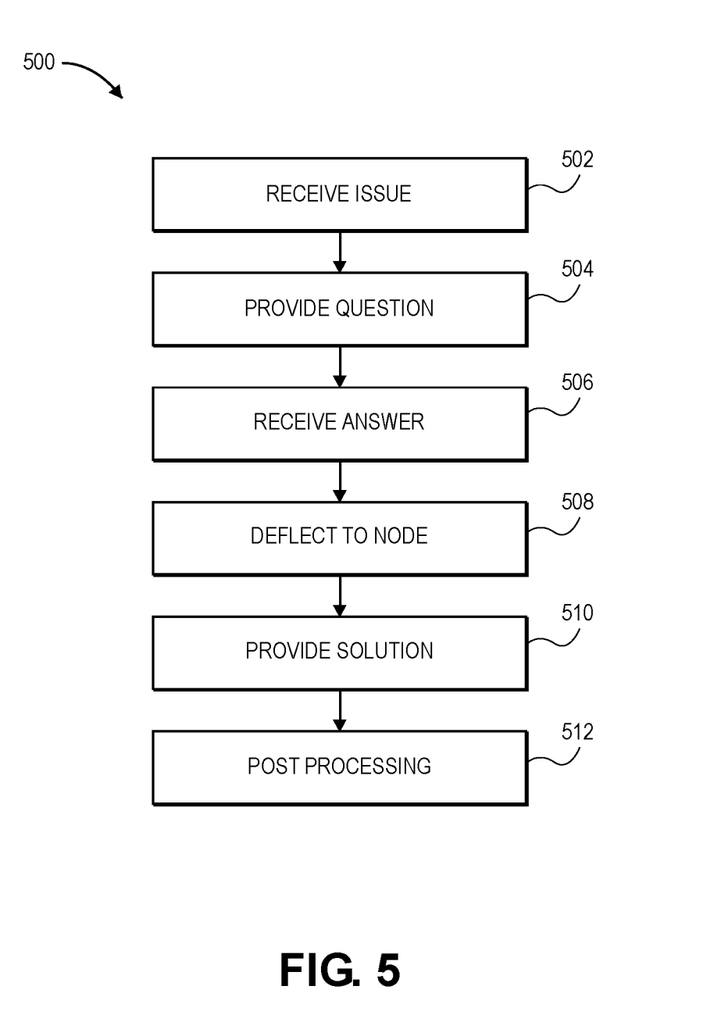
FIG. 5 depicts an exemplary process for providing solutions to user issues.

FIG. 5 depicts an exemplary process of resolving a user issue by support tree 300 generally reference by numeral 500. At step 502, receive issue from the user. As described above, the user may encounter an issue utilizing an application. The application may be any application associated with software, systems, and the like and may be stored on a client device of the user or provided as SaaS or IaaS. As such, the user may report the issue to application provider and be presented a user interface for connected to support assistant system 100 providing automated solutions to the user issue.

At step 504, a question may be provided to the user to gain information about the issue that the user has encountered. The question may be a standard question such as, for example, "Is the issue related to warehouse orders?" In some embodiments, the question may be generated by support assistant system 100 based on the user's input. In some embodiments, experts 102 may review issue regenerations or issue summaries to determine the questions that may be provided to the user at nodes of support tree 300.

At step 506, a response may be received from the user. The user may provide a response to the question in any form. For example, the question, as stated above, may require a binary "yes" or "no" type response. In some embodiments, the question may be open ended such as, "describe the issue with warehouse orders." As such, a text input field may be presented to the user. The machine learning and statistical algorithms described above may be used to detect words, word count, correlations between words, and semantic meaning. As such, the issues may further be determined from the user's response and a node deflection may occur on support tree 300 to a solution corresponding to the issues.

At step 508, a node deflection may occur based on the response from the user. As described above, the response from the user may provide information about the issue. When the issue is determined with an associated probability, a deflection may occur on support tree 300 to a node corresponding to the determined issue. From the new node, a new question may be provided to further narrow the issue to known issue with a small number of solutions or, if the issue is determined to a fine granularity to provide a solution, then the corresponding solution may be provided.

At step 510, at least one solution may be provided to the user. When the issue is determined an associated solution, or a plurality of solutions, may be provided to the user. The solutions may comprise textual instructions, links, exemplary code, and any other format of a solution that may be useful to the user. In some embodiments, the solution may simply be cut and pasted into the software by the user to update the system. Furthermore, a link may be provided to update the software of the application. Any solution to any issue may be imagined.

At step 512, perform various post-processing tasks such as, for example, notify the expert if solution wasn't reached, notify the expert if the solution did not resolve the issue, update support assistant system 100 with results for future analysis and generation of support tree 300. Any data collected during the interaction with the user and providing the solution may be stored for future analysis and updates. Furthermore, the results of the solution may be stored for analysis and updating the support assistant system 100. In some embodiments, the user may be provided a questionnaire to evaluate the effectiveness of support assistant system 100 and provide information to the experts.

Figure 6:
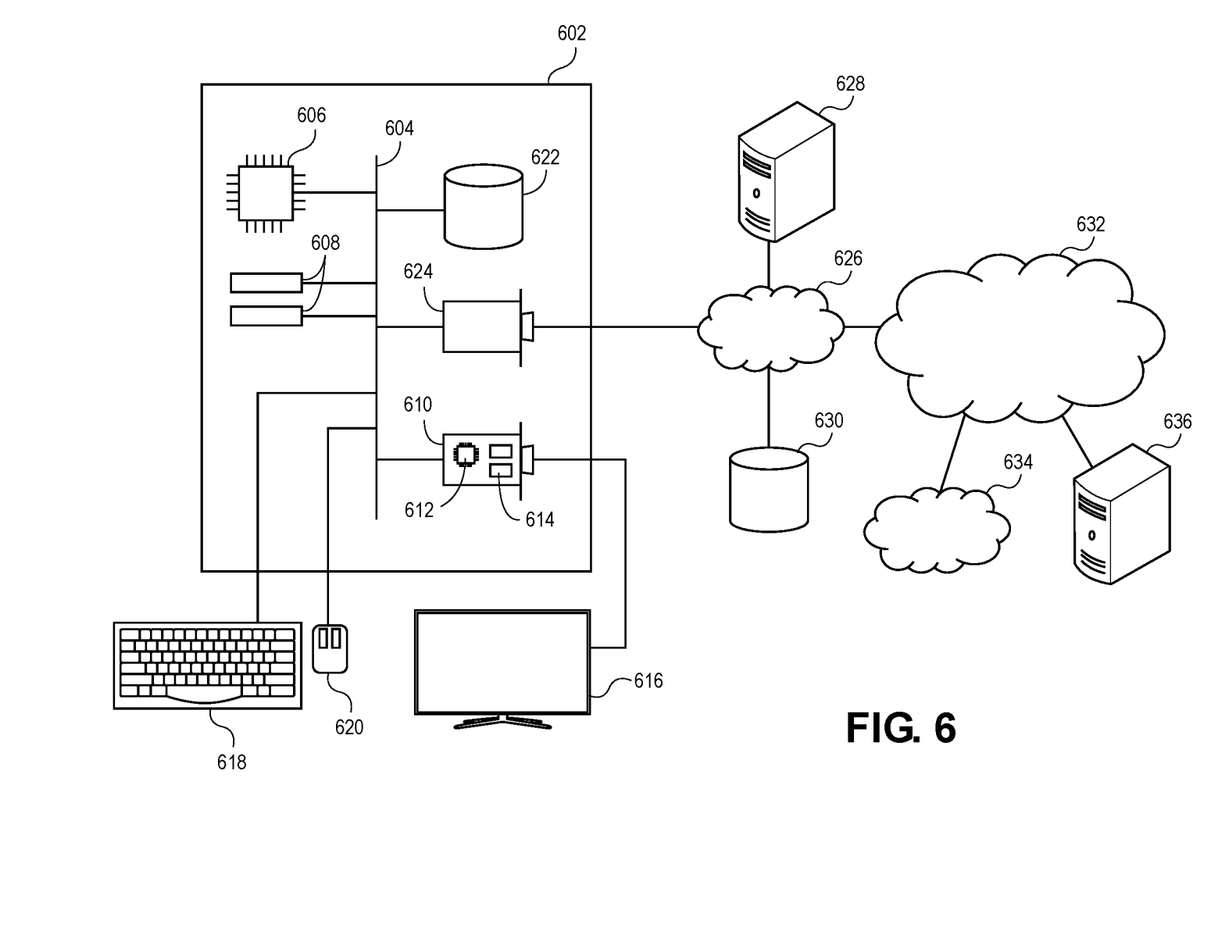
FIG. 6 depicts an exemplary embodiment of a hardware platform for use with embodiments of the present disclosure.

Turning to FIG. 6, an exemplary hardware platform that can form one element of certain embodiments of the disclosure is depicted. Computer 602 can be a desktop computer, a laptop computer, a server computer, or any other form factor of general- or special-purpose computing device. Depicted with computer 602 are several components, for illustrative purposes. In some embodiments, certain components may be arranged differently or absent. Additional components may also be present. Included in computer 602 is system bus 604, whereby other components of computer 602 can communicate with each other. In certain embodiments, there may be multiple busses or components may communicate with each other directly. Connected to system bus 604 is central processing unit (CPU) 606 or any other type of processor. Also attached to system bus 604 are one or more random-access memory (RAM) modules 608. Also attached to system bus 604 is graphics card 610. In some embodiments, graphics card 610 may not be a physically separate card, but rather may be integrated into the motherboard or the CPU 606. In some embodiments, graphics card 610 has a separate graphics-processing unit (GPU) 612, which can be used for graphics processing or for general purpose computing (GPGPU). Also on graphics card 610 is GPU memory 614. Connected (directly or indirectly) to graphics card 610 is display 616 for user interaction. In some embodiments no display is present, while in others it is integrated into computer 602. Similarly, peripherals such as keyboard 618 and mouse 620 are connected to system bus 604. Like display 616, these peripherals may be integrated into computer 602 or absent. Also connected to system bus 604 is local storage 622, which may be any form of computer-readable media and may be internally installed in computer 602 or externally and removably attached.

Non-transitory, computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 624 is also attached to system bus 604 and allows computer 602 to communicate over a network such as local network 626. NIC 624 can be any form of network interface known in the art, such as Ethernet, ATM, fiber, Bluetooth, or Wi-Fi (i.e., the IEEE 802.11 family of standards). NIC 624 connects computer 602 to local network 626, which may also include one or more other computers, such as computer 628, and network storage, such as data store 630. Generally, a data store such as data store 630 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein such as backup or versioning. Data stores can be local to a single computer such as computer 628, accessible on a local network such as local network 626, or remotely accessible over Internet 632. Local network 626 is in turn connected to Internet 632, which connects many networks such as local network 626, remote network 634 or directly attached computers such as computer 636. In some embodiments, computer 602 can itself be directly connected to Internet 632.

Although the disclosure has been described with reference to the embodiments illustrated in the attached drawing figures, it is noted that equivalents may be employed, and substitutions made herein without departing from the scope of the disclosure as recited in the claims.

Having thus described various embodiments of the disclosure, what is claimed as new and desired to be protected by Letters Patent includes the following:

1. A method comprising:
obtaining historical data comprising a history of support interactions including historical issues and prior solutions to the historical issues;
determining a number of most used prior solutions from the prior solutions to the historical issues;
determining correlations between the most used prior solutions;
generating clusters of the most used prior solutions and one or more associated historical issues;
determining keywords from the historical issues and associated most used prior solutions;
generating labels for each cluster based on the determined keywords;
generating a plurality of questions to be presented to a user to obtain issue information from the user, each question associated with at least one cluster; and
automatically generating, using one or more computing device, a support tree comprising a plurality of clusters of nodes, each cluster containing a plurality of nodes, a label for the cluster from the generated labels, and an associated question of the plurality of questions,
wherein each node of the plurality of nodes is indicative of both at least one associated historical issues and at least one solution to the one or more associated historical issues from the clusters of most used prior solutions.

2. The method of claim 1, further comprising correlating a plurality of solutions to a single issue, wherein a first solution of the plurality of solutions resolves a symptom and a second solution of the plurality of solutions resolves a cause.

3. The method of claim 1, further comprising:
generating an issue summary of the historical issues in a textual chart from recognition of the historical issues and the most used prior solutions; and
generating the issue summary in a vector format.

4. The method of claim 3, wherein the issue summary includes a title, a symptom, a cause, and a resolution.

5. The method of claim 4, wherein a first node of the plurality of nodes on the support tree comprises a plurality of related topics, and wherein deflecting from the first node to a second node reduces a field of potential issues and potential issue solutions to the potential issues.

6. The method of claim 4, further comprising:
generating a plurality of potential questions for the user based on the issue summary;
providing the issue summary and the plurality of potential questions to an expert; and
receiving the plurality of questions from the expert to be presented to the user at each node of the support tree.

7. The method of claim 1, wherein the clusters are generated by non-negative matrix factorization.

8. The method of claim 1, further comprising:
receiving issue data indicative of a user issue from a client device of the user;
identifying a first cluster of nodes, corresponding to the user issue, in the support tree;
providing the associated question for the first cluster of nodes to the user to obtain the issue information indicative of the user issue;
traversing the support tree from the first cluster of nodes to a second cluster of nodes based on the issue information provided by the user in response to the one or more questions; and
providing the one or more solutions to the user to resolve the user issue.

9. One or more non-transitory computer-readable media storing computer-executable instructions that, when executed by a processor, perform a method of comprising:
obtaining historical data comprising a history of support interactions including historical issues and prior solutions to the historical issues;
determining a number of most used prior solutions from the prior solutions to the historical issues;
determining correlations between the most used prior solutions;
generating clusters of the most used prior solutions and one or more associated historical issues;
determining keywords from the historical issues and associated most used prior solutions;
generating labels for each cluster based on the determined keywords;
generating a plurality of questions to be presented to a user to obtain issue information from the user, each question associated with at least one cluster; and
automatically generating a support tree comprising a plurality of clusters of nodes, each cluster containing a plurality of nodes, a label for the cluster from the generated labels, and an associated question of the plurality of questions,
wherein each node of the plurality of nodes is indicative of both at least one associated historical issues and at least one solution to the one or more associated historical issues from the clusters of most used prior solutions.

10. The media of claim 9, wherein the computer-executable instructions are further executed to perform:
receiving issue data indicative of a user issue from a client device of the user;
providing one or more questions of the plurality of questions to the user to obtain the issue information indicative of the user issue;
deflecting between nodes on the support tree to reduce a field of possible solutions based on the issue information provided by the user in response to the one or more questions; and
providing the one or more solutions to the user to resolve the user issue.

11. The media of claim 9, wherein the computer-executable instructions are further executed to perform correlating a plurality of solutions to a single issue, wherein a first solution of the plurality of solutions resolves a symptom and a second solution of the plurality of solutions resolves a cause.

12. The media of claim 9, wherein the computer-executable instructions are further executed to perform:
generating a plurality of potential questions for the user;
providing the plurality of potential questions to an expert; and
receiving the plurality of questions from the expert to be presented to the user at each node of the support tree.

13. The media of claim 9, wherein the clusters are generated by non-negative matrix factorization.

14. The media of claim 9, wherein the computer-executable instructions are further executed to perform:
generating an issue summary of the historical issues in a textual chart from recognition of the historical issues and the most used prior solutions; and
generating the issue summary in a vector format.

15. The media of claim 14, wherein the issue summary includes a title, a symptom, a cause, and a resolution.

16. A system comprising:
a processor;
one or more non-transitory computer-readable media storing computer-executable instructions that, when executed by a processor, perform operations for generating a support tree for automated resolution of user issues, the operations comprising:
obtaining historical data comprising a history of support interactions including historical issues and prior solutions to the historical issues;
determining a number of most used prior solutions from the prior solutions to the historical issues;
determining correlations between the most used prior solutions;
generating clusters of the most used prior solutions and one or more associated historical issues;
determining keywords from the historical issues and associated most used prior solutions;
generating labels for each cluster based on the determined keywords;
generating a plurality of questions to be presented to a user to obtain issue information from the user, each question associated with at least one cluster; and
automatically generating a support tree comprising a plurality of clusters of nodes, each cluster containing a plurality of nodes, a label for the cluster from the generated labels, and an associated question of the plurality of questions,
wherein each node of the plurality of nodes is indicative of both at least one associated historical issues and at least one solution to the one or more associated historical issues from the clusters of most used solutions.

17. The system of claim 16, wherein the computer-executable instructions are further executed to perform correlating a plurality of solutions to a single issue, wherein a first solution of the plurality of solutions resolves a symptom and a second solution of the plurality of solutions resolves a cause.

18. The system of claim 16, wherein the computer-executable instructions are further executed to perform:
generating a plurality of potential questions for the user;
providing the plurality of potential questions to an expert; and receiving the plurality of questions from the expert to be presented to the user at each node of the support tree.

19. The system of claim 16, wherein the computer-executable instructions are further executed to perform:
generating an issue summary of the historical issues in a textual chart from recognition of the historical issues and the most used prior solutions; and
generating the issue summary in a vector format.

20. The system of claim 19, wherein the issue summary includes a title, a symptom, a cause, and a resolution.

* * * * *